United States Patent
Breedvelt-Schouten et al.

(10) Patent No.: US 11,943,276 B2
(45) Date of Patent: Mar. 26, 2024

(54) LINE-DRAWING VIDEO CONFERENCING

(71) Applicant: INTERNATIONAL BUSINESS MACHINES CORPORATION, Armonk, NY (US)

(72) Inventors: Ilse M. Breedvelt-Schouten, Manotick (CA); Jana H. Jenkins, Raleigh, NC (US); John A. Lyons, Ottawa (CA); Jeffrey A. Kusnitz, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 170 days.

(21) Appl. No.: 17/656,102

(22) Filed: Mar. 23, 2022

(65) Prior Publication Data
US 2023/0308500 A1 Sep. 28, 2023

(51) Int. Cl.
*H04L 65/00* (2022.01)
*G06T 7/13* (2017.01)
(Continued)

(52) U.S. Cl.
CPC ............ *H04L 65/80* (2013.01); *G06T 7/13* (2017.01); *G06T 11/203* (2013.01);
(Continued)

(58) Field of Classification Search
None
See application file for complete search history.

(56) References Cited

U.S. PATENT DOCUMENTS 8,576,271 B2 * 11/2013 Moore ............... H04L 12/1827
370/263
10,212,390 B1 * 2/2019 Christian ............ H04N 5/2621
(Continued)

FOREIGN PATENT DOCUMENTS

CN 112437247 A 3/2021

OTHER PUBLICATIONS

Anonymous, "Tutorial: AKVIS Sketch—Transformation of a Video into a Cartoon," akvis.com, [accessed on Feb. 15, 2022], 6 pages, Retrieved from the Internet: <URL: https://akvis.com/en/sketch-tutorial/examples/cartoon-film.php>.
(Continued)

*Primary Examiner* — Martin Mushambo
(74) *Attorney, Agent, or Firm* — Elliot J. Shine

(57) ABSTRACT

A method, computer system, and a computer program product for optimizing web conferencing is provided. The present invention may include receiving data for an organization, the organization being comprised of a plurality of participants. The present invention may include receiving a scheduled web conference. The present invention may include determining a network bandwidth threshold for each of the plurality of participants of the scheduled web conference based on at least the data received for the organization and data associated with the scheduled web conference. The present invention may include monitoring a network bandwidth of the scheduled web conference. The present invention may include determining whether to transmit a line art drawing for one or more participants based on the network bandwidth of the scheduled web conference.

20 Claims, 5 Drawing Sheets

(51) Int. Cl.
  *G06T 11/00* (2006.01)
  *G06T 11/20* (2006.01)
  *H04L 65/80* (2022.01)
(52) U.S. Cl.
  CPC ............ *G06T 2207/10016* (2013.01); *G06T 2207/30201* (2013.01); *G06T 2210/08* (2013.01)

(56) References Cited

U.S. PATENT DOCUMENTS

| | | | | |
|---|---|---|---|---|
| 10,536,741 | B1* | 1/2020 | Madison | H04N 21/43076 |
| 2006/0174312 | A1* | 8/2006 | Ducheneaut | H04N 21/242 725/138 |
| 2008/0148306 | A1* | 6/2008 | Mutual | H04L 47/15 725/114 |
| 2009/0129405 | A1* | 5/2009 | Lauwers | H04L 65/1066 370/468 |
| 2009/0222520 | A1* | 9/2009 | Sloo | H04N 21/6581 709/205 |
| 2010/0121666 | A1* | 5/2010 | Niazi | H04L 12/1818 705/7.27 |
| 2011/0316965 | A1* | 12/2011 | Moore | H04L 12/1827 348/14.09 |
| 2012/0054323 | A1* | 3/2012 | Chandrasekaran | H04L 12/66 709/223 |
| 2012/0059930 | A1* | 3/2012 | Devarakonda | H04L 43/0817 709/224 |
| 2012/0059937 | A1* | 3/2012 | Dheap | H04L 47/10 709/226 |
| 2012/0059943 | A1* | 3/2012 | Castro Castro | H04L 12/1471 709/227 |
| 2012/0311043 | A1* | 12/2012 | Chen | H04N 21/43615 709/204 |
| 2013/0051237 | A1* | 2/2013 | Ong | H04L 47/522 370/237 |
| 2013/0076980 | A1* | 3/2013 | Oren | H04N 21/4223 348/E5.009 |
| 2013/0170818 | A1* | 7/2013 | Klappert | G06Q 50/01 386/299 |
| 2013/0198298 | A1* | 8/2013 | Li | H04N 21/64322 709/206 |
| 2013/0339530 | A1* | 12/2013 | Nishioka | H04L 47/762 709/226 |
| 2014/0003450 | A1* | 1/2014 | Bentley | H04N 7/15 370/468 |
| 2014/0067828 | A1* | 3/2014 | Archibong | H04N 21/84 707/748 |
| 2014/0096169 | A1* | 4/2014 | Dodson | H04N 21/6543 725/97 |
| 2014/0173701 | A1* | 6/2014 | Albouyeh | H04L 12/1822 726/4 |
| 2015/0172238 | A1* | 6/2015 | Ahmed | H04N 21/4788 709/217 |
| 2016/0078903 | A1* | 3/2016 | Chitnis | H04N 5/765 386/219 |
| 2016/0173292 | A1* | 6/2016 | McCoy | H04L 65/403 348/14.08 |
| 2017/0273044 | A1* | 9/2017 | Alsina | H04N 21/4788 |
| 2017/0310926 | A1* | 10/2017 | Patel | H04N 21/4122 |
| 2018/0262792 | A1* | 9/2018 | Mackay | H04N 21/44227 |
| 2018/0352303 | A1* | 12/2018 | Siddique | H04L 65/1069 |
| 2019/0215482 | A1* | 7/2019 | Sathya | H04N 7/15 |
| 2019/0222531 | A1* | 7/2019 | Lin | H04L 41/5022 |
| 2020/0029110 | A1* | 1/2020 | Xin | H04M 3/14 |
| 2021/0289255 | A1* | 9/2021 | Balint | H04N 21/812 |
| 2022/0070012 | A1* | 3/2022 | Liang | H04N 7/152 |

OTHER PUBLICATIONS

Author Unknown, "The Vectorizer", synthetik.com [datasheet], [accessed on Mar. 10, 2022], 45 pages, Retrieved from the Internet: <URL: https://synthetik.com/vectorizer-feature/>.

Brown, "How to Convert Digital Videos into Cartoons?", Wondershare.com, Jan. 14, 2022 [accessed on Feb. 15, 2022], 5 pages, Retrieved from the Internet: <URL: https://filmora.wondershare.com/video-editing-tips/how-to-convert-video-to-cartoon.html>.

Disclosed Anonymously, "A System and Method to Enable Low-Cost Network Transmission Bandwidth to Transfer Videos of a Face," IP.com, Jun. 20, 2016, 3 pages, IP.com No. IPCOM000246582D, Retrieved from the Internet: <URL: https://priorart.ip.com/IPCOM/000246582>.

Disclosed Anonymously, "Face Movement Tracing and Rebuilding for Reduced Data Transmission in Video Conferences," IP.com, Aug. 12, 2020, 7 pages, IP.com No. IPCOM000263252D, Retrieved from the Internet: <URL: https://priorart.ip.com/IPCOM/000263252>.

Disclosed Anonymously, "Method and system for reducing bandwidth usage during video conferencing using video analytics," IP.com, Aug. 27, 2020, 6 pages, IP.com No. IPCOM000263399D, Retrieved from the Internet: <URL: https://priorart.ip.com/IPCOM/000263399>.

Gartenberg, "Olli turns all your pictures and videos into illustrated art in real time", theverge.com, Apr. 27, 2017 [accessed on Feb. 15, 2022], 4 pages, Retrieved from the Internet: <URL: https://www.theverge.com/circuitbreaker/2017/4/27/15451300/olli-filter-app-illustrated-animation-hand-drawn-effect-ios>.

Hillen, "NVIDIA Research develops a neural network to replace traditional video compression", dpreview.com, Oct. 6, 2020 [accessed on Mar. 10, 2022], 7 pages, Retrieved from the Internet: <URL: https://www.dpreview.com/news/5756257699/nvidia-research-develops-a-neural-network-to-replace-traditional-video-compression>.

Mell, et al., "The NIST Definition of Cloud Computing", National Institute of Standards and Technology, Special Publication 800-145, Sep. 2011, 7 pages.

Wikipedia, "Face detection", Wikipedia, the free encyclopedia, [accessed on Feb. 15, 2022], 4 pages, Retrieved from the Internet: <URL: https://en.wikipedia.org/wiki/Face_detection>.

Wiles, "Turn off that camera during virtual meetings, environmental study says", Purdue University, Jan. 14, 2021 [accessed on Feb. 15, 2022], 8 pages, Retrieved from the Internet: <URL: https://www.purdue.edu/newsroom/releases/2021/Q1/turn-off-that-camera-during-virtual-meetings,-environmental-study-says.html>.

* cited by examiner

LINE-DRAWING VIDEO CONFERENCING

BACKGROUND

The present invention relates generally to the field of computing, and more particularly to web conferencing.

Web conferencing may be a term used for various types of online conferencing and collaborative services including at least webinars, webcasts, and web meetings. Web conferencing may be used in social gatherings, live discussions, professional meetings, training events, lectures, and/or presentations, amongst other things. Depending on the technology being used, presenters may utilize both audio and/or video in communicating with web conference participants.

In web conferences presenters and/or participants may frequently deal with bandwidth issues which may compromise both audio and/or video communication. Presenters and/or participants of the web conference may often solve bandwidth issues by ceasing video communication which may lead to less effective communication.

SUMMARY

Embodiments of the present invention disclose a method, computer system, and a computer program product for web conferencing. The present invention may include receiving data for an organization, the organization being comprised of a plurality of participants. The present invention may include receiving a scheduled web conference. The present invention may include determining a network bandwidth threshold for each of the plurality of participants of the scheduled web conference based on at least the data received for the organization and data associated with the scheduled web conference. The present invention may include monitoring a network bandwidth of the scheduled web conference. The present invention may include determining whether to transmit a line art drawing for one or more participants based on the network bandwidth of the scheduled web conference.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
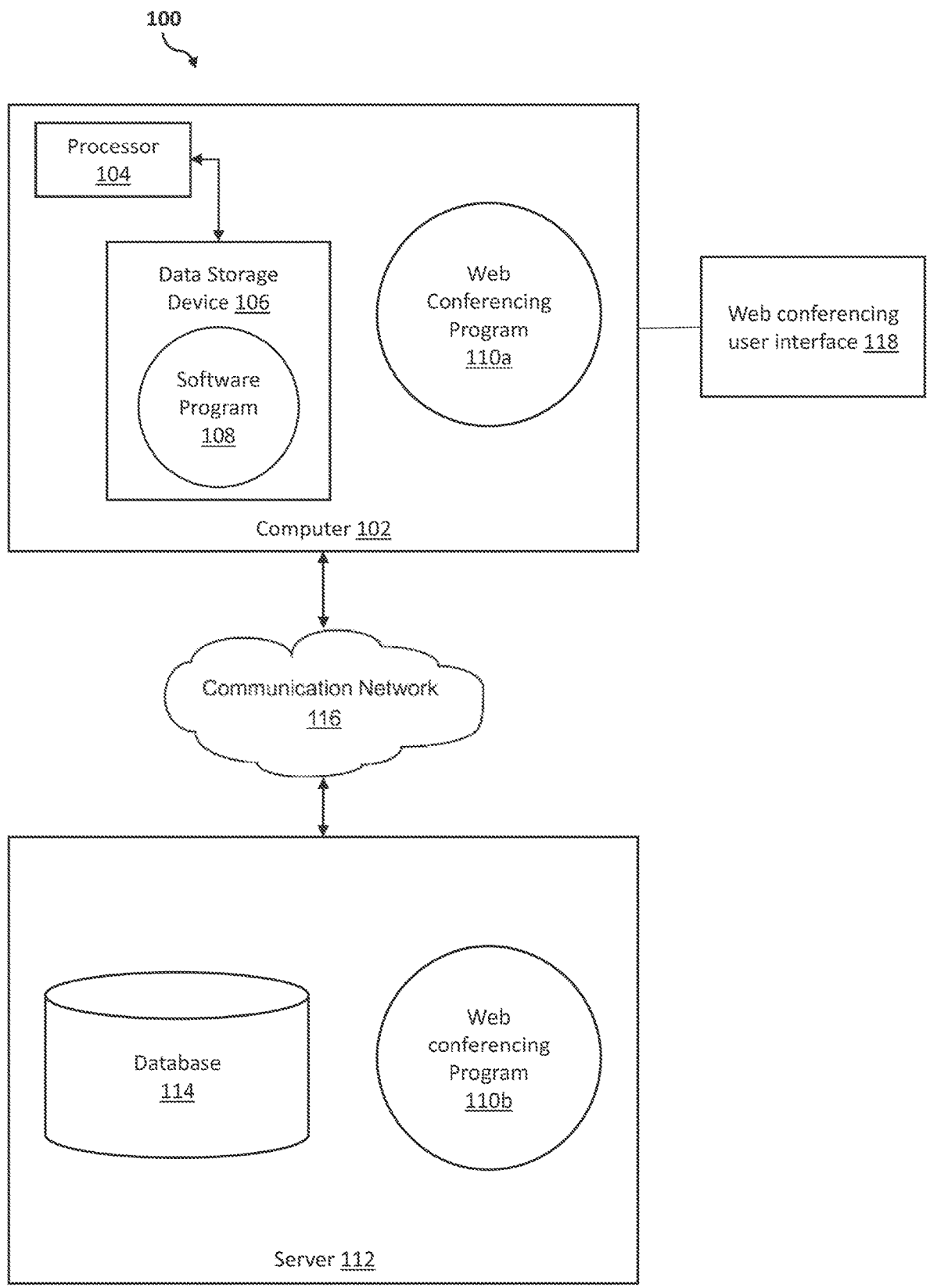
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart qillustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for web conference optimization. As such, the present embodiment has the capacity to improve the technical field of web conferencing by transmitting line art drawings of one or more participants of a scheduled web conference based on the network bandwidth. More specifically, the present invention may include receiving data for an organization, the organization being comprised of a plurality of participants. The present invention may include receiving a scheduled web conference. The present invention may include determining a network bandwidth threshold for each of the plurality of participants of the scheduled web conference based on at least the data received for the organization and data associated with the scheduled web conference. The present invention may include monitoring a network bandwidth of the scheduled web conference. The present invention may include determining whether to transmit a line art drawing for one or more participants based on the network bandwidth of the scheduled web conference.

As described previously, web conferencing may be a term used for various types of online conferencing and collaborative services including at least webinars, webcasts, and web meetings. Web conferencing may be used in social gatherings, live discussions, professional meetings, training events, lectures, and/or presentations, amongst other things. Depending on the technology being used, presenters may utilize both audio and/or video in communicating with web conference participants.

In web conferences presenters and/or participants may frequently deal with bandwidth issues which may compromise both audio and/or video communication. Presenters and/or participants of the web conference may often solve bandwidth issues by ceasing video communication which may lead to less effective communication.

Therefore, it may be advantageous to, among other things, receive data for an organization, the organization being comprised of a plurality of participants, receive a scheduled web conference, determine a network bandwidth threshold for each of the plurality of participants of the scheduled web conference, monitor the network bandwidth of the scheduled web conference, and determine whether to transmit a line art drawing for one or more participants based on the network bandwidth of the scheduled web conference.

According to at least one embodiment, the present invention may improve web conference interactions between participants by utilizing line art drawings to maintain visual communication between participants in low network bandwidth scenarios.

According to at least one embodiment, the present invention may improve network bandwidth utilization by converting video images of one or more participants to line drawings based on a determination that the network bandwidth of the scheduled web conference is less than the network bandwidth threshold for the one or more participants.

According to at least one embodiment, the present invention may improve network bandwidth utilization by prioritizing participants of a web conference more likely to be active, have a speaking role, and/or higher in an organization hierarchal structure.

According to at least one embodiment, the present invention may improve energy consumption by optimizing a limited amount of central processing units (CPUs) on each of the plurality of participants devices by only rendering vectors and/or color information in the form of a line art drawing for each of the one or more participants below a network bandwidth threshold.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a web conference program 110a. The networked computer environment 100 may also include a server 112 that is enabled to run a web conference program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the web conference program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the web conferencing program 110a, 110b (respectively) to maintain visual communication in a web conference for participants with low bandwidth. The web-conferencing method is explained in more detail below with respect to FIG. 2.

Figure 2:
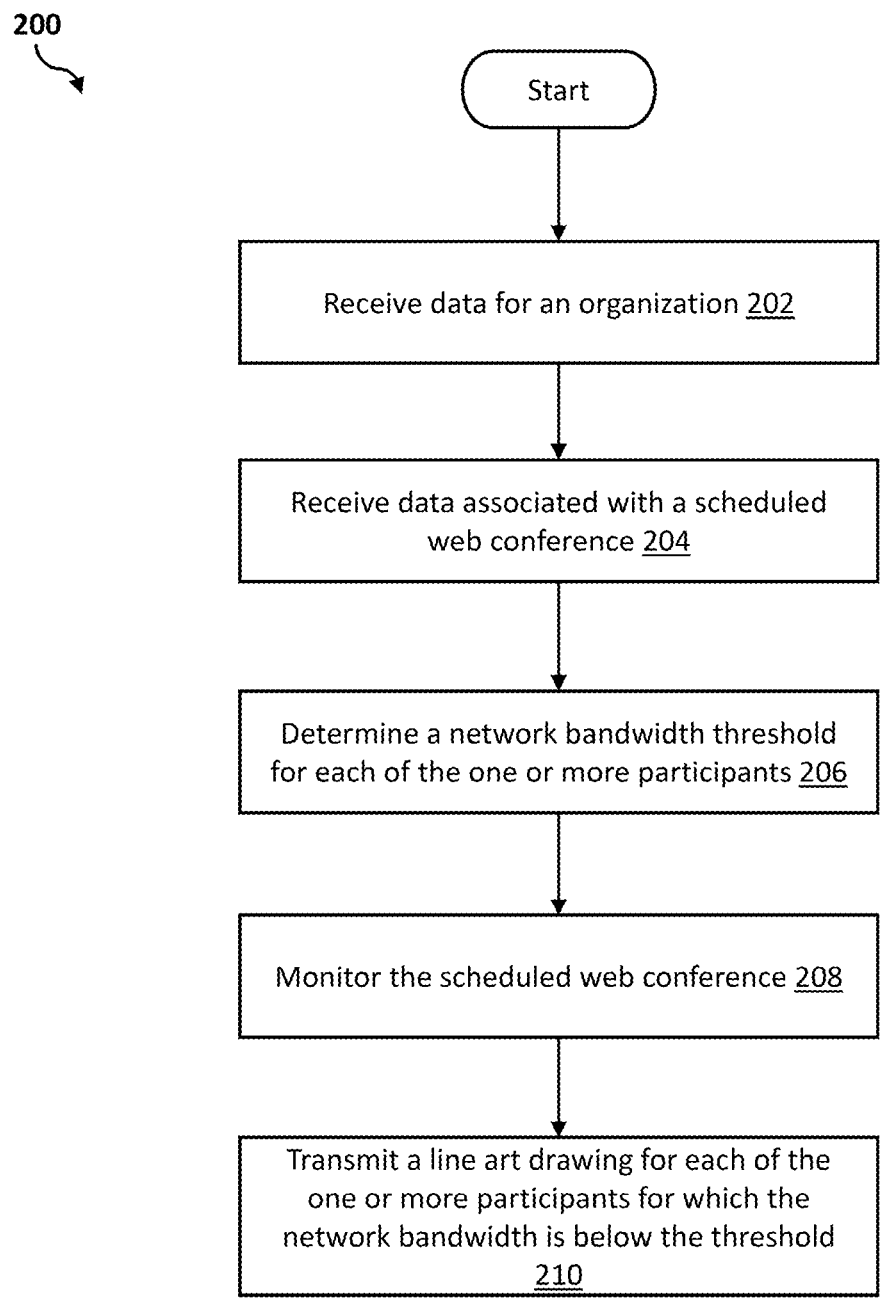
FIG. 2 is an operational flowchart illustrating a process for optimizing web conferencing according to at least one embodiment.

Referring now to FIG. 2, an operational flowchart illustrating the exemplary web conferencing process 200 used by the web conferencing program 110a and 110b according to at least one embodiment is depicted.

At 202, the web conferencing program 110 receives data for an organization. The organization may be a business entity, non-profit organization, educational institution, or any other organization comprised of a plurality of participants (e.g., employees, volunteers, lecturers, students, presenters) which may utilize web conferencing in communicating between participants.

Upon consent of a user, the web conferencing program 110 may receive and/or access data from one or more web conferencing scheduling tools utilized by the organization and/or organizational information. Consent may be obtained in real time or through a prior waiver or other process that informs a subject that their data may be captured by appropriate devices or other sensitive personal data may be gathered through any means and that this data may be analyzed by any of the many algorithms that may be implemented herein. Data accessed and/or received from the one or more web conferencing scheduling tools may include, but is not limited to including, emails, calendars, prior web conference minutes, web conference transcripts, attendance records, web conference participation records, web conference subjects and/or descriptions, amongst other data which may be accessed from the one or more web conferencing scheduling tools by which participants of the organization may receive, accept, and/or schedule web conferences. The web conferencing program 110 may also receive and/or access organizational information, such as, but not limited to, internal documentation, an organizational directory, management chain, job and/or role descriptions, participant titles, amongst other organizational information. The data received and/or accessed by the web conferencing program 110 may be stored in a knowledge corpus (e.g., database 114). Data received and/or accessed by the web conferencing program 110 shall not be construed as to violate or encourage the violation of any local, state, federal, or international laws with respect to privacy protection.

As will be explained in more detail below with respect to step 204, the data received and/or accessed by the web conferencing program 110 may be utilized in at least determining which of the participants of a web conference may be prioritized with respect to network bandwidth. The web conferencing program 110 may utilize a hierarchal analysis and/or one or more linguistic analysis techniques in analyzing at least the one or more web conferencing scheduling tools and/or organizational information. The one or more hierarchal analysis techniques utilized by the web conferencing program 110 may include, but are not limited to including, the Galton-Watson branching process, the Lightweight Directory Access Protocol (LDAP), amongst other hierarchal analysis techniques. The web conferencing program 110 may utilize the one or more hierarchal analysis techniques in generating a hierarchal organizational structure comprising the plurality of participants of the organization. The organizational structure may be a directory information tree (DIT) illustrating a position of each of the plurality of participants relative to one another within the organization.

The one or more linguistic analysis tools utilized by the web conferencing program 110 may include, but are not limited to including, a machine learning model with Natural Language Processing (NLP), Latent Dirichlet Allocation (LDA), speech-to-text, Hidden markov models (HMM), N-grams, Speaker Diarization (SD), Semantic Textual Similarity (STS), Keyword Extraction, amongst other analysis techniques, such as those implemented in IBM Watson® (IBM Watson and all Watson-based trademarks are trademarks or registered trademarks of International Business Machines Corporation in the United States, and/or other countries), IBM Watson® Speech to Text, IBM Watson® Tone Analyzer, IBM Watson® Natural Language Understanding, IBM Watson® Natural Language Classifier, amongst other linguistic analysis techniques. As will be explained in more detail below, the one or more linguistic analysis tools may be utilized in analyzing the data accessed and/or received from the one or more web conferencing scheduling tools in understanding which of the plurality of participants may be most likely to be active in a web conference.

At 204, the web conferencing program 110 receives data associated with a scheduled web conference. The web conferencing program 110 may receive the data associated with the scheduled web conference utilizing access to the one or more web conference scheduling tools utilized by the organization. The scheduled web conference may include data such as, but not limited to, a subject line, a meeting agenda, whether the meeting is a recurring or one time meeting, time of the meeting, scheduled presenters, participants invited, whether the scheduled web conference is mandatory or optional, amongst other data which may be included for the scheduled web conference.

The web conferencing program 110 may utilize the one or more linguistic analysis techniques detailed above in analyzing the data associated with the scheduled web conference. As will be explained in more detail below, the analysis of the data associated with the scheduled web conference may enable the web conferencing program 110 to determine which of the plurality of participants are most likely to be active in the scheduled web conference. The web conferencing program 110 may prioritize the participants most likely to be active with respect to network bandwidth.

At 206, the web conferencing program 110 determines a network bandwidth threshold for each of the one or more participants of the scheduled web conference. The web conferencing program 110 may utilize at least, one or more of, the organizational structure, data accessed and/or received from the one or more web conference scheduling tools, and/or the data associated with the scheduled web conference in determining the network bandwidth threshold for each of the participants of the scheduled web conference.

The network bandwidth threshold may be determined for each of the plurality of participants of the scheduled web conference to prioritize a video image of participants more likely to be active and/or higher within the organizational structure. For example, the web conferencing program 110 may receive a scheduled web conference for an organization. The scheduled web conference may be a recurring event with 100 participants. Additionally, the data associated with the scheduled web conference may include 5 scheduled speakers. Utilizing the linguistic analysis tools discussed above the web conferencing program 110 may determine that based on an available network bandwidth, 80 participants will likely remain inactive, and 15 participants will likely be active based on web conference transcripts and web conference participation records of the previous web conferences for the current recurring event. Accordingly, the web conferencing program 110 may determine three different thresholds for network bandwidth, one threshold for the 80 participants likely to remain inactive, another threshold for the 15 participants likely to be active, and another threshold for the 5 scheduled speakers. In this example, the web conferencing program 110 may prioritize the video image of the 5 scheduled speakers and/or the 15 participants likely to be active based on the available network bandwidth over the 80 participants likely to remain inactive during the scheduled web conference.

In an embodiment, the web conferencing program 110 may dynamically adjust the network bandwidth threshold for each of the one or more participants of the scheduled web conference based on the number of participants joining and/or leaving the scheduled web conference. The web conferencing program 110 may also consider features to be utilized in the scheduled web conference in determining the network bandwidth threshold for each of the one or more participants. Features which may be utilized in the scheduled web conference may include, but are not limited to including, polling, screen sharing, downloadable content, file share upload, web links, question and/or answer features, amongst other features which may be utilized in the scheduled web conference.

At 208, the web conferencing program 110 monitors the scheduled web conference. The web conferencing program 110 may monitor at least the network bandwidth and/or a video image of one or more participants. The web conferencing program 110 may monitor bandwidth utilizing one or more bandwidth monitoring tools in at least determining an amount of data being transmitted and/or latency in determining how fast data is being transmitted in the web conference.

The web conferencing program 110 may monitor the network bandwidth of the web conference relative to the network bandwidth threshold of each of the one or more participants of the scheduled web conference. As will be explained in more detail below, the web conferencing program 110 may display one or more prompts to each of the one or more participants of a network bandwidth threshold as the network bandwidth approaches the predetermined bandwidth threshold for those participants. The one or more prompts may be utilized by the web conferencing program 110 in at least managing the available network bandwidth of the scheduled web conference, enabling one or more participants to manage video image transmission, providing one or more recommendations to one or more participants, and/or receiving permission to transmit a line art drawing from one or more participants. As will be explained in more detail below, the one or more prompts may be displayed by the web conferencing program 110 to the one or more participants in a web conference user interface 118.

The web conferencing program 110 may only monitor the video image of participants for which the web conferencing program 110 receives permission. The web conferencing program 110 may receive permission from a participant in one or more ways, including, but not limited to including, prompts displayed to the participant in the web conference user interface 118, permission granted by a participant within user preferences of the web conference user interface 118, amongst other ways the web conferencing program 110 may receive permission to access the video image of a participant. The conference user interface 118 may be displayed by the web conferencing program 110 in at least an internet browser, dedicated software application, or as an integration with a third party software application, amongst other mediums. The web conferencing program 110 may never access any video image of any participant of web conference if their video sharing is disabled. The access of any video images and/or other data from the participants of the web conference may not be construed as to violate or encourage the violation of any local, state, federal, or international law with respect to privacy protection.

In an embodiment, the web conferencing program 110 may display a prompt to one or more participants of the scheduled web conference. The prompt may include one or more options by which the one or more participants may decrease their bandwidth usage based on the network bandwidth associated with the scheduled web conference, as described above. The web conferencing program 110 may display the prompt to the one or more participants prior to the network bandwidth falling below the predetermined network bandwidth for the one or more participants. Continuing with the example above, the web conferencing program 110 may display a prompt to the 80 participants likely to remain inactive as the network bandwidth approaches the predetermined bandwidth threshold for those participants. The prompt may enable the participants to enable video image access for the web conferencing program and/or disable all video image transmission for the web conference. As will be explained in more detail below, the web conferencing program 110 may disable transmission of the video image transmission for one or more participants when the network bandwidth is less than the predetermined bandwidth of the one or more participants. The web conferencing program 110 may transmit a line art drawing of the one or more participants who enabled the video image access. The line art drawing being derived from the video image of the participant.

In an embodiment, a participant may preemptively enable transmission of their line art drawing and/or line art drawings of other participants regardless of the network bandwidth for a scheduled web conference. The participant may preemptively enable the transmission of their line art drawing and/or line art drawings of other participants in the web conference user interface 118. For example, a participant of an organization may be located in a remote location and may frequently experience connection issues in web conferences. This participant may choose to transmit their line art drawing and/or receive line art drawings of the other participants preemptively to avoid connection issues while still retaining the personability and/or visual communications of the web conference.

In an embodiment, the web conferencing program 110 may provide one or recommendations to one or more of the plurality of participants. The web conferencing program 110 may provide the one or more recommendations to the participants in the web conferencing user interface 118. The one or more recommendations may include steps by which each participant may minimize their bandwidth consumption. The one or more recommendations may be provided to the plurality of participants prior to the scheduled web conference based on factors such as the number of participants attending and/or in real time as the scheduled web conference may be taking place. In this embodiment, the web conferencing program 110 may continue to learn which features may be utilized for each scheduled conference and may provide recommendations accordingly. For example, based on the data associated with the scheduled web conference the web conferencing program 110 may determine the scheduled web conference may be utilizing, polling, screensharing, and an active chat. The scheduled web conference may also have 100 confirmed participants. Accordingly, the web conferencing program 110 may recommend one or more features be disabled to one or more participants and/or preemptively enable one or more participants to transmit a line art drawing.

At 210, the web conferencing program 110 determines whether to transmit a line art drawing. The web conferencing program 110 may determine whether to transmit the line art drawing for one or more participants based on the network bandwidth of the scheduled web conference and/or based on a participant indication in response to the one or more prompts. The web conferencing program 110 may determine to transmit the line art drawing based on the network bandwidth of the scheduled web conference being below the network bandwidth threshold of at least one or more participants. The web conferencing program 110 may disable the video image transmission for each of the one or more participants of the network bandwidth threshold and transmit the line art drawing for each of the one or more participants who enabled the transmission of the line art drawing.

The web conferencing program 110 may generate the line art drawings for each of the one or more participants based on the video image of the one or more participants in which access was granted at step 208. The web conferencing program 110 may utilize one or more edge detection methods in converting facial elements of the participant into vector lines and converting those vector lines into pencil lines. The one or more edge detection methods may include, but are not limited to including, Prewitt edge detection, Sobel edge detection, Laplacian edge detection, Canny edge detection, amongst other edge detection methods. The pencil lines may be filled in by the web conferencing program 110 using colors identified in the video image of the participant. The web conferencing program 110 may also utilize additional visual analysis tools such as, but not limited to, image mapping technology, object segmentation techniques, object-based image analysis, a Convolutional Neural Network (CNN), supervised/unsupervised image classification techniques OpenCV™ (Open CV and all Open-CV-based trademarks or registered trademarks of Open Source Computer Vision Library in the United. States and/or other countries), Image)/FIJI, amongst other visual analysis tools. The web conferencing program 110 may utilize at least pre-trained classifiers in conjunction with the visual analysis tools in classifying objects segmented form the video image. The pre-trained classifiers may be stored in the knowledge corpus (e.g., database 114).

The web conferencing program 110 may additionally utilize image mapping technology in transmitting the line art drawing for each of the one or more participants to the other participants of the web conference. The image mapping technology may be utilized in transmitting the line art drawing in real time such that the participant's expressions, hand gestures, mannerisms, and/or other forms of non-visual communication which may be animated through the line art drawing of the participant to the other participants of the web conference.

In an embodiment, the web conferencing program 110 may enable a participant to switch back to a transmission of their video image prior to participating and/or may automatically switch the line art drawing of the participant to the video image based on the actions of the participant, such as, but not limited to, unmuting, posting a message in the web conference chat, speaking, and/or other activities that may indicate a participant's desire to engage. In this embodiment, the web conferencing program 110 may dynamically convert participants to and from line art drawings based on activity such that the network bandwidth may be sustained above various threshold levels.

It may be appreciated that FIG. 2 provides only an illustration of one embodiment and do not imply any limitations with regard to how different embodiments may be implemented. Many modifications to the depicted embodiment(s) may be made based on design and implementation requirements.

Figure 3:
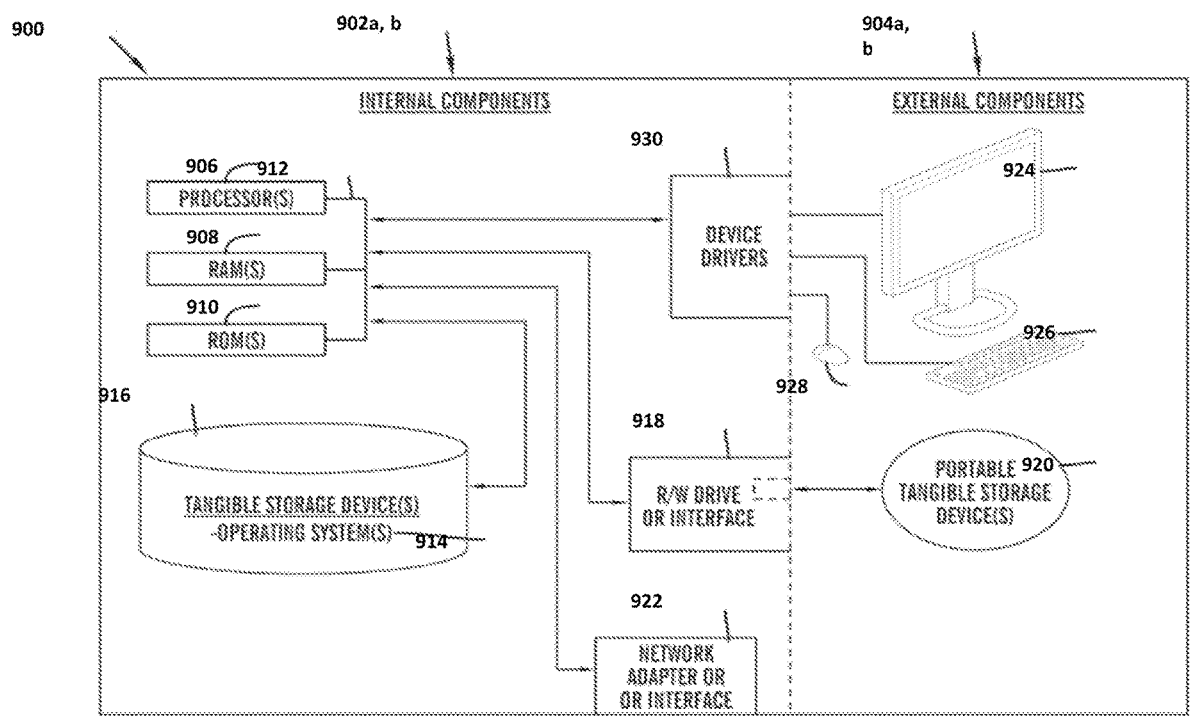
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 3. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the web conferencing program 110a in client computer 102, and the web conferencing program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semi-conductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the web conferencing program 110a and 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the web conferencing program 110a in client computer 102 and the web conferencing program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the web conferencing program 110a in client computer 102 and the web conferencing program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
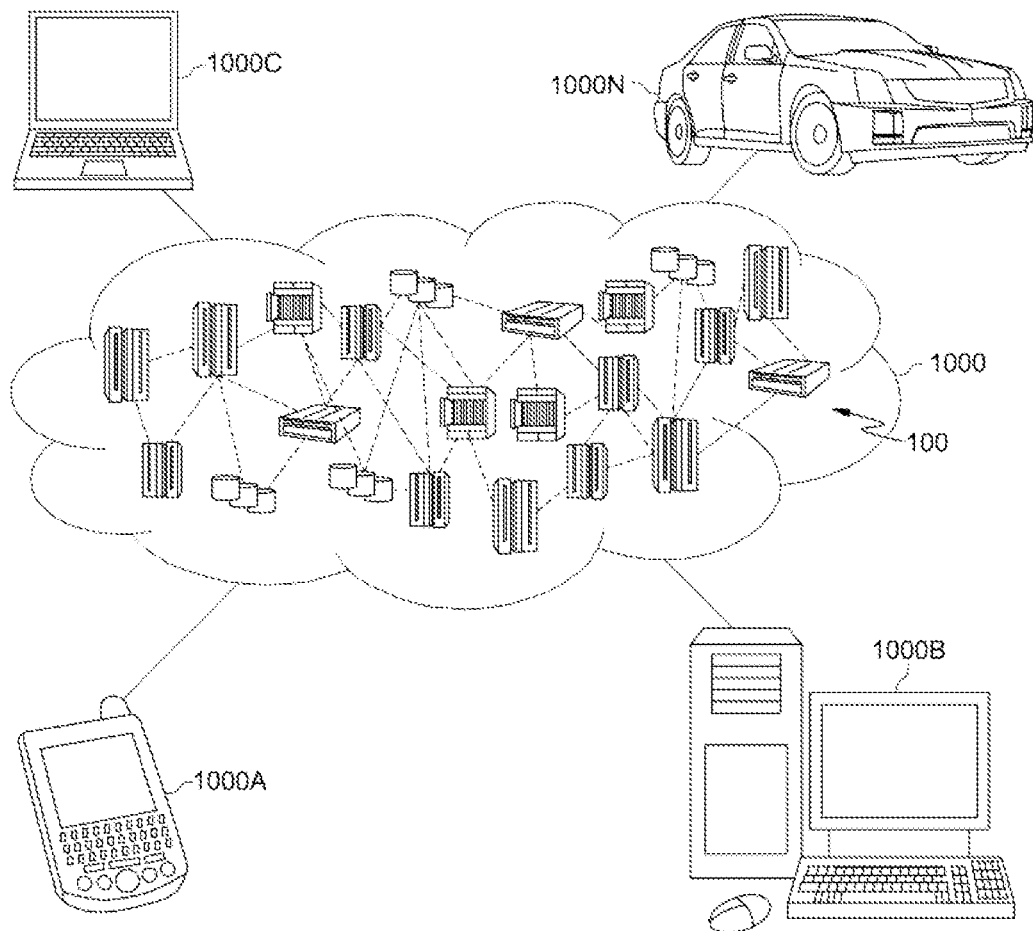
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
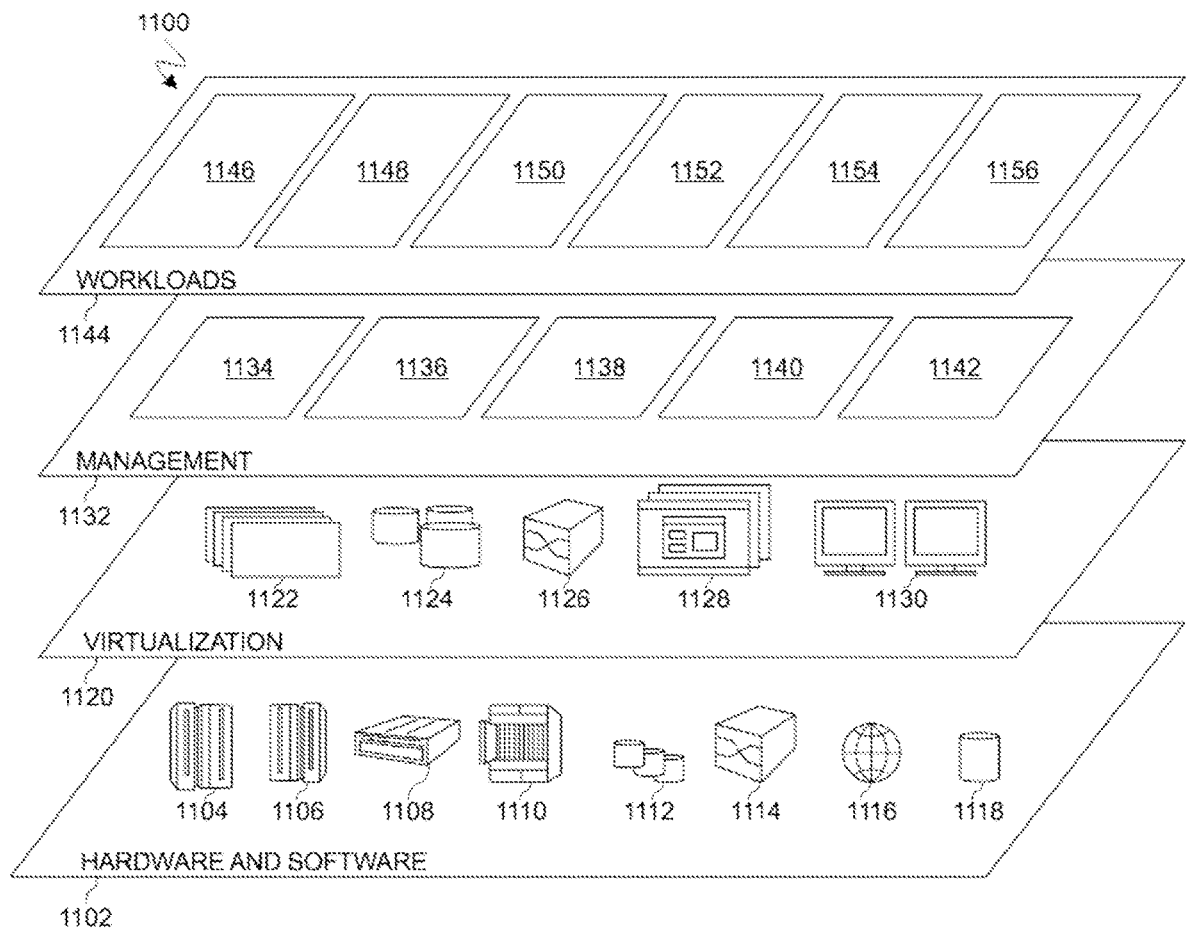
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and web conferencing program 1156. A web conferencing program 110a, 110b provides a way to include determining a network bandwidth threshold for each of the plurality of participants of the scheduled web conference based on at least the data received for the organization and data associated with the scheduled web conference.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

The present disclosure shall not be construed as to violate or encourage the violation of any local, state, federal, or international law with respect to privacy protection.

What is claimed is:

1. A method for optimizing web conferencing, the method comprising:
    receiving data for an organization, the organization being comprised of a plurality of participants;
    receiving a scheduled web conference;
    analyzing data associated with the scheduled web conference and data accessed from one or more web conferencing scheduling tools using one or more linguistic analysis tools;
    determining a network bandwidth threshold for each of the plurality of participants of the scheduled web conference based on at least the data received for the organization and data associated with the scheduled web conference;
    monitoring a network bandwidth of the scheduled web conference; and
    determining whether to transmit a line art drawing for one or more participants based on the network bandwidth of the scheduled web conference.

2. The method of claim 1, further comprising:
    determining the network bandwidth of the scheduled web conference is less than the network bandwidth threshold for at least the one or more participants of the plurality of participants; and
    disabling the video image for at least the one or more participants.

3. The method of claim 2, further comprising:
    displaying a prompt to the one or more participants in a web conference user interface, wherein the prompt enables the one or more participants to transmit the line art drawing; and
    transmitting the line art drawing for each of the one or more participants.

4. The method of claim 3, wherein the line art drawing is generated for each of the one or more participants based on the video image of the one or more participants using one or more visual analysis tools.

5. The method of claim 1, wherein determining the network bandwidth threshold for each of the plurality of participants further comprises:
    performing a hierarchal analysis on the data for the organization; and
    generating an organizational structure of the organization, wherein the organizational structure includes the position of each of the plurality of participants relative to one another within the organization.

6. The method of claim 1, wherein determining the network bandwidth threshold for each of the plurality of participants further comprises:
    determining which of the plurality of participants are most likely to be active in the scheduled web conference.

7. The method of claim 1, wherein the network bandwidth threshold may be different for at least two or more participants of the plurality of participants.

8. A computer system for web conferencing, comprising:
    one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
    receiving data for an organization, the organization being comprised of a plurality of participants;
    receiving a scheduled web conference;
    analyzing data associated with the scheduled web conference and data accessed from one or more web conferencing scheduling tools using one or more linguistic analysis tools;
    determining a network bandwidth threshold for each of the plurality of participants of the scheduled web conference based on at least the data received for the organization and data associated with the scheduled web conference;
    monitoring a network bandwidth of the scheduled web conference; and
    determining whether to transmit a line art drawing for one or more participants based on the network bandwidth of the scheduled web conference.

9. The computer system of claim 8, further comprising:
    determining the network bandwidth of the scheduled web conference is less than the network bandwidth threshold for at least the one or more participants of the plurality of participants; and
    disabling the video image for at least the one or more participants.

10. The computer system of claim 9, further comprising:
    displaying a prompt to the one or more participants in a web conference user interface, wherein the prompt enables the one or more participants to transmit the line art drawing; and
    transmitting the line art drawing for each of the one or more participants.

11. The computer system of claim 10, wherein the line art drawing is generated for each of the one or more participants based on the video image of the one or more participants using one or more visual analysis tools.

12. The computer system of claim 8, wherein determining the network bandwidth threshold for each of the plurality of participants further comprises:
    performing a hierarchal analysis on the data for the organization; and
    generating an organizational structure of the organization, wherein the organizational structure includes the position of each of the plurality of participants relative to one another within the organization.

13. The computer system of claim 8, wherein determining the network bandwidth threshold for each of the plurality of participants further comprises:
    determining which of the plurality of participants are most likely to be active in the scheduled web conference.

14. The computer system of claim 8, wherein the network bandwidth threshold may be different for at least two or more participants of the plurality of participants.

15. A computer program product for web conferencing, comprising:
- one or more non-transitory computer-readable storage media and program instructions stored on at least one of the one or more tangible storage media, the program instructions executable by a processor to cause the processor to perform a method comprising:
- receiving data for an organization, the organization being comprised of a plurality of participants;
- receiving a scheduled web conference;
- analyzing data associated with the scheduled web conference and data accessed from one or more web conferencing scheduling tools using one or more linguistic analysis tools;
- determining a network bandwidth threshold for each of the plurality of participants of the scheduled web conference based on at least the data received for the organization and data associated with the scheduled web conference;
- monitoring a network bandwidth of the scheduled web conference; and
- determining whether to transmit a line art drawing for one or more participants based on the network bandwidth of the scheduled web conference.

16. The computer program product of claim 15, further comprising:
- determining the network bandwidth of the scheduled web conference is less than the network bandwidth threshold for at least the one or more participants of the plurality of participants; and
- disabling the video image for at least the one or more participants.

17. The computer program product of claim 16, further comprising:
- displaying a prompt to the one or more participants in a web conference user interface, wherein the prompt enables the one or more participants to transmit the line art drawing; and
- transmitting the line art drawing for each of the one or more participants.

18. The computer program product of claim 17, wherein the line art drawing is generated for each of the one or more participants based on the video image of the one or more participants using one or more visual analysis tools.

19. The computer program product of claim 15, wherein determining the network bandwidth threshold for each of the plurality of participants further comprises:
- performing a hierarchal analysis on the data for the organization; and
- generating an organizational structure of the organization, wherein the organizational structure includes the position of each of the plurality of participants relative to one another within the organization.

20. The computer program product of claim 15, wherein determining the network bandwidth threshold for each of the plurality of participants further comprises:
- determining which of the plurality of participants are most likely to be active in the scheduled web conference.

* * * * *